United States Patent [19]

Levy

[11] Patent Number: 4,613,220

[45] Date of Patent: Sep. 23, 1986

[54] ENDLESS FILM CARTRIDGE AND PRESSURE SUPPORT PLATE THEREFOR

[75] Inventor: Leon M. Levy, Chicago, Ill.

[73] Assignee: C. A. Parshall, Inc., Stamford, Conn.

[21] Appl. No.: 658,566

[22] Filed: Oct. 9, 1984

[51] Int. Cl.$^4$ .............................................. G03B 23/02
[52] U.S. Cl. ..................................... 352/78 R; 352/72
[58] Field of Search ................................. 352/72, 78 R

[56] References Cited

U.S. PATENT DOCUMENTS 3,206,757  9/1965  Schrader ................................. 352/72
3,244,471  4/1966  Mead ...................................... 352/72
3,271,096  9/1966  Blackmore ............................. 352/72

Primary Examiner—Monroe H. Hayes
Attorney, Agent, or Firm—Haynes N. Johnson

[57] ABSTRACT

A film cartridge is provided to hold an endless film strip for storage and display. The cartridge includes a pressure support plate to hold the film in a focus plane for projection, which plate is a resilient, generally ellipsoidal loop with a front projection opening and means for securing the loop to the cartridge in a position to resiliently and uniformly press against the perimeter of the front opening in the cartridge to thereby guide and control motion of the film strip.

11 Claims, 6 Drawing Figures

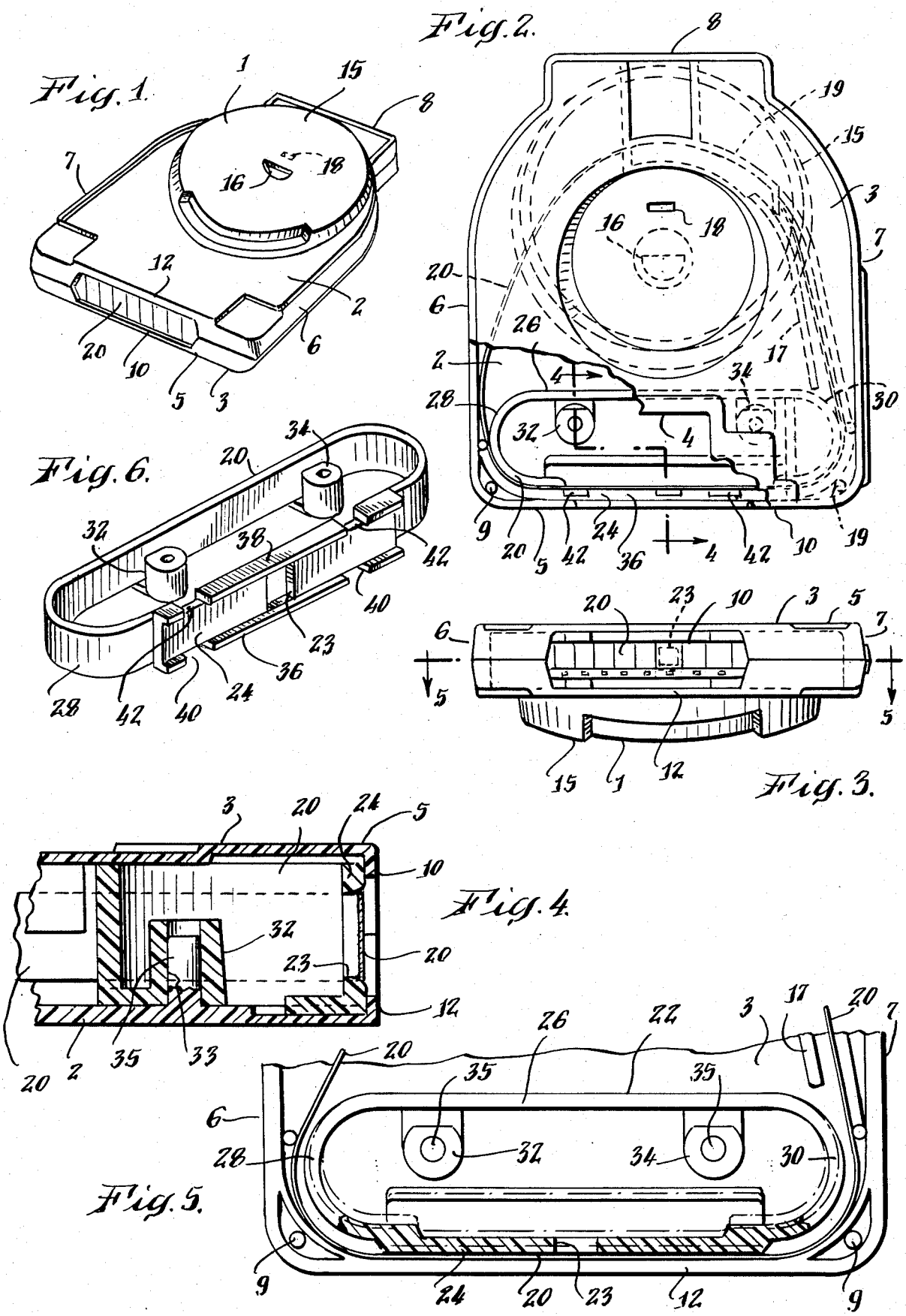

ENDLESS FILM CARTRIDGE AND PRESSURE SUPPORT PLATE THEREFOR

FIELD OF INVENTION

This invention relates to the field of film cartridges adapted to carry endless film strips, both for storage and for use in the projector without removal from the cartridge.

BACKGROUND OF INVENTION

Film cartridges have existed, adapted for carrying endless film strips, which serve both as a container for the film and as a means for holding the film while it is projected. Such cartridges eliminate the need for threading the film prior to projection and for rewinding it after projection. An example of such a cartridge will be found in Mead U.S. Pat. No. 3,244,471, which uses the same general type of film threading and film storage chamber, as does the present invention.

Film cartridges of this nature, however, when used in large quantities, such as for educational purposes, must be inexpensive to manufacture. This requires the use of a minimal number of simple and inexpensive parts and a structure permitting ease of assembly. The present invention meets these criteria in that it has only three plastic parts, each of which is moldable. It turns out that this structure is not only considerably less expensive to manufacture, but is a better and more serviceable cartridge.

SUMMARY OF THE INVENTION

The cartridge of this invention includes three parts: an upper housing section, a complementary lower housing section that snap-fits to the upper section, and a resilient, generally ellipsoidal pressure plate secured to the lower section. Film guides are integrally molded within the section and the pressure plate serves as an additional guide.

The pressure plate is of generally ellipsoidal shape except the front face is flat with edge guides to provide a film guide and pressure plate. The rear of the plate is preferably flat and secured to the lower housing. The front face presses against the periphery of a projection opening in the housing. The resiliency of the rounded end section of the plate serves to provide uniform pressure on the film to hold it in the plane of focus.

THE DRAWINGS

FIG. 1 is a perspective view of the assembled cartridge showing the front (projection) end, including a portion of the film strip.

FIG. 2 is a bottom plan view of the cartridge, partially broken away, to show a portion of the ellipsoidal loop used to provide a pressure support plate for the film.

FIG. 3 is a front elevation of the cartridge.

FIG. 4 is a partial sectional view taken on line 4—4 of FIG. 2 showing the positioning of the ellipsoidal loop within the cartridge.

FIG. 5 is a partial section taken on line 5—5 of FIG. 3 showing the mounced loop acting as a pressure plate and holding the film against the front of the cartridge.

FIG. 6 is a perspective view of the ellipsoidal loop structure alone.

DETAILED DESCRIPTION OF THE INVENTION

Turning to the drawings, the film cartridge is generally depicted by the numeral 1. Its outer housing is composed of two complementary, snapped together sections, upper section 2 and lower section 3. The sections together define a front surface 5, sides 6 and 7, and a rear portion 8. Front surface 5 has a projection aperture 10 therein having a perimeter 12.

The general configuration of the unit is similar to that disclosed in the Mead patent in that it has a coiled film chamber 15 for holding the bulk of the endless strip of film and film guides 17 and 19 for guiding the passage of film 20 through the unit.

The unit also includes, as its third part, a film pressure plate having a generally ellipsoidal shape, i.e., ellipsoidal in the sense that the front section 24 of the ellipsoidal loop is generally planar as, preferably, is the rear section 26; and the end sections 28 and 30 are preferably rounded and of semicircular cross-section. The end sections 28 and 30 serve to flex and act as springs; they also serve as film guides. Bosses 32 and 34 are molded integrally with the inner side of rear section 26 and are used to secure the loop 22 to the inner surface of lower section 3. The loop is secured adhesively to lower section 3, but, preferably, is positioned by having contacting surfaces of the bosses and the lower housing shaped as for example by pins and receiving holes, such as 33 and 34, respectively, in boss 34, for complementary fit.

Ellipsoidal loop 22 is made of firm, but resilient plastic material, such as nylon or delrin, and is so dimensioned relative to its position within the cartridge that, when secured to the inner surface of the cartridge, its front section 24 is spring pressed toward the inner surface of the perimeter 12 of projection aperture 10. The pressure should be sufficient to hold the film 20 against the perimeter 12 within a constant plane of focus and yet permit the film to be advanced from one frame to the next. To this end, the perimeter 12 and the front section 24 should have smooth surfaces.

The inner surface of front section 24 may have a molded integral bar 35 along one edge and transverse thereto. This provides stiffness for the front section, helping to maintain its planarity and so better maintaining the film in the focus plane. There may also be a complementary recess 37 in the inner surface of lower section 3 to receive bar 35 and act as a guide for its movement. This is especially useful when pressing section 24 inwardly as the film is loaded.

Lower section 3 of film cartridge housing includes an opening 4 to receive a mirror at an approximate forty-five degree angle to receive projection light directed into the cartridge and reflect it outwardly through the film 20 and projection aperture 10. Opening 4 is so positioned that the mirror will fit between front and rear sections 24 and 26 of film pressure plate 22, thus enabling the projection light to enter through opening 4, be reflected from the mirror, and pass outwardly through the film 20 and projection aperture 10.

Front section 24 of the pressure plate may include film guides 36 and 38 along its upper and lower edges. These guides should extend beyond the surface of front section 24 a distance approximately equal to the thickness of the film and that of two layers of splicing tape (the film is an endless loop). In that way proper pressure may be maintained on the film to keep it in its plane of focus. These guides may, if desired, have openings 40 and 42 therein used to position the cartridge properly in the projection machine.

On outer edge of the aperture 23 adjacent one of the film guides 36 or 38 is preferably raised slightly (about 0.015″) to press against the film. This rubs slightly on the film but only with enough friction to hold the film in place at the start/stop position. This edge runs in the same direction as the film travels in order to minimize film wear.

The upper and lower sections of the housing, 2 and 3, may best be aligned for assembly purposes by the use of pins on one section and complementary holes on the other. These can, for example, be such as the alignment pins 9 in lower section 3, with corresponding receiving holes (not shown) in upper section 2. The two sections may be held together in any desired manner, but my preferred form is to have a recess 16 in the center of coiled film chamber 15 with a catch opening therein adapted to receive a snap hook 18 molded integrally with lower section 3.

The unit, then, consists of three pieces and is easy to assemble. These pieces are the upper section 2 of the housing, the lower section 3 of the housing, which snap together, and the ellipsoidal loop or film pressure plate 22. Assembly is then readily accomplished by adhesively securing integral bosses 32, 34 over their complementary pins 35 to secure loop 22, placing an endless strip of film in the coiled film chamber 15 and feeding it through film guides 17 and 19 and between pressure plate 22 and front section 24, and then snapping the upper section of the housing in place by use of the recess 16 and the hook 16. At the time this is done, the upper and lower sections 2 and 3 are aligned by means of pins 9 or their equivalent.

Compared to the prior art, this assembled unit has several advantages. First of all, it has but three parts which easily fit into position and snap together. It is not a matter of utilizing a separate metallic pressure plate and mounting with a spring and then feeding the film at risk of knocking the pressure plate out of position. In addition to having fewer parts, the parts are molded and fit together easily, reducing labor costs. Further the pressure plate 22, having two mounting bosses 32 and 34, serves to create a uniform spring tension pressing its front section 24 toward the perimeter 12 of aperture 10 so that, instead of having pressure coming solely from one side and being uneven, the pressure comes from a uniform spring tension at each end, i.e., section 28 and 30 of pressure plate 22, thus assuring uniform pressure on the film to keep in uniformly in the plane of focus for projection.

In use, this film cartridge is used in the same manner as prior art units. It is inserted into a projector with a mirror which enters opening 4 in the lower section between front and rear sections 24 and 26 of pressure plate 2 and so directs light outwardly through the aperture 23 in the front section 24 of pressure plate 22 and through the projection aperture 10 formed in the front surface 12 of the film cartridge 1. It is positioned within the projector by use of alignment openings 40 and 42.

What is claimed is:

1. A pressure support plate for film in a film cartridge adapted to hold an endless strip of film for storage and for display in a projector, said cartridge including a housing with upper and lower surfaces, a front and sides, a projection aperture in said front, a film storage chamber, and guide members for directing said film serially from said chamber to said projection chamber and back, said support plate including an ellipsoidal loop having elongated front and rear sections, said front section being generally planar and having a projection opening in the center thereof and projector alignment openings in at least one edge thereof, said front and rear sections being spaced sufficiently to receive a projection mirror between them and in line with said front projection opening, means formed integrally with said rear section for securing said loop to one of said surfaces, said loop being made of resilient material and dimensioned relative to its mounting position on said surface, to resiliently press toward the perimeter of said front projection aperture, whereby film may be driven in said cartridge and will be held in a projection plane at said projection aperture.

2. A pressure support plate as set forth in claim 1 including a transverse bar along one inner edge of said front section and molded integrally therewith.

3. A pressure support plate as set forth in claim 1 including film guide rails along the outer edges of said front face.

4. A pressure support plate as set forth in claim 3 in which said alignment openings in said projector are in said guide rails.

5. A molded plastic film cartridge adapted to hold an endless strip of film for storage and for display in a projector, said cartridge including a housing formed of upper and lower complementary sections secured together and including a film storage chamber and guide means for directing said film into and out of said chamber, a projection aperture in the front of said housing an ellipsoidal plastic loop mounted behind said aperture, said loop including a front planar surface and a rear portion, said front planar surface including a projection opening, said rear portion being secured to one of said housing sections, and said front surface being proximate to the periphery of said projection aperture, said loop being made of resilient material and dimensioned relative to its position on said housing section to resiliently press toward the perimeter of said front projection aperture, whereby said endless strip of film will, when driven in said cartridge, be held in a projection plane at said projection aperture.

6. A film cartridge as set forth in claim 5 in which said front surface of said loop includes film guide rails along the edges thereof and the inner surface of said front surface has a molded transverse integral bar.

7. A film cartridge as set forth in claim 6 in which the inner surface of said housing section proximate to said transverse integral bar includes a recess to receive said bar and guide the movement thereof.

8. A film cartridge as set forth in claim 5 in which said upper and lower complementary housing sections include a complementary snap hook and opening to snap lock said sections together.

9. A film cartridge as set forth in claim 5 in which said rear portion of said loop is secured to said one of said housing sections at two positions removed from one another and proximate to the ends of said rear portion.

10. A film cartridge as set forth in claim 5 in which said front surface of said loop includes film guide rails and said rails include alignment openings for positioning said cartridge in said projector.

11. A film cartridge as set forth in claim 10 including a raised edge proximate to said projection opening to frictionally engage said film.

* * * * *